(12) United States Patent
Niimi

(10) Patent No.: US 6,911,102 B2
(45) Date of Patent: Jun. 28, 2005

(54) LAMINATED TYPE SEMICONDUCTOR CERAMIC ELEMENT AND PRODUCTION METHOD FOR THE LAMINATED TYPE SEMICONDUCTOR CERAMIC ELEMENT

(75) Inventor: Hideaki Niimi, Hikone (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 10/693,460

(22) Filed: Oct. 27, 2003

(65) Prior Publication Data

US 2004/0084132 A1 May 6, 2004

Related U.S. Application Data

(62) Division of application No. 09/635,818, filed on Aug. 9, 2000, now abandoned.

(30) Foreign Application Priority Data

Aug. 9, 1999 (JP) ............................................ 11-225482

(51) Int. Cl.$^7$ ....................... B32B 31/26; C04B 35/468; H01C 7/02
(52) U.S. Cl. ................... 156/89.14; 156/89.16
(58) Field of Search ......................... 156/89.12, 89.14, 156/89.16; 264/614, 615, 618; 361/321.2, 321.3, 321.4, 321.5

(56) References Cited

U.S. PATENT DOCUMENTS

| | | | | |
|---|---|---|---|---|
| 3,912,527 A | * | 10/1975 | Utsumi et al. | 501/139 |
| 3,920,781 A | | 11/1975 | Eror | |
| 4,022,716 A | * | 5/1977 | Ueoka et al. | 252/520.21 |
| 4,386,985 A | * | 6/1983 | Dirstine | 156/89.14 |
| 4,863,883 A | * | 9/1989 | Menashi et al. | 501/138 |
| 5,166,759 A | * | 11/1992 | Ueno et al. | 257/624 |
| 5,248,640 A | * | 9/1993 | Sano et al. | 501/137 |
| 5,646,080 A | * | 7/1997 | Chu et al. | 501/137 |
| 5,731,950 A | * | 3/1998 | Sakamoto et al. | 361/321.4 |
| 5,889,647 A | * | 3/1999 | Hansen et al. | 361/311 |

FOREIGN PATENT DOCUMENTS

| | | | |
|---|---|---|---|
| DE | 1646724 | * | 7/1971 |
| JP | 55-29177 | * | 3/1980 |
| JP | 55050615 | * | 4/1980 |
| JP | 57-202703 | * | 12/1982 |
| JP | 58-48908 | * | 3/1983 |
| JP | 59-10201 | | 1/1984 |

(Continued)

OTHER PUBLICATIONS

Japanese Office Action issed Apr. 22, 2003 (with English translation of relevant portion).
Japanese Office Action issed Dec. 24, 2002 (w/English translation of relevant portion).

*Primary Examiner*—Melvin C. Mayes
(74) *Attorney, Agent, or Firm*—Dickstein, Shapiro, Morin & Oshinsky, LLP.

(57) ABSTRACT

A laminated type semiconductor ceramic element is provided with good PTC characteristics, low room temperature resistance value and improved withstand voltage of 15V or higher. Semiconductor ceramic layers made from a semiconductor ceramic containing barium titanate as the main component and the element nickel at about 0.2 mol % or less (excluding 0 mol %), and internal electrode layers are superimposed alternately, and an external electrode is formed so as to be connected electrically with the internal electrode layers. The production method comprises the steps of obtaining a laminated product of semiconductor material layers containing a barium titanate as the main component and about 0.2 mol % or less (excluding 0 mol %) of the element nickel, and internal electrode layers, obtaining a laminated sintered compact by reduction baking of the laminated product, forming an external electrode electrically connected with the internal electrodes of the laminated sintered compact, and re-oxidization processing.

14 Claims, 1 Drawing Sheet

FOREIGN PATENT DOCUMENTS

| | | | |
|---|---|---|---|
| JP | 59217322 | * | 12/1984 |
| JP | 60-118667 | | 6/1985 |
| JP | 62-229602 | * | 10/1987 |
| JP | 63-312616 | | 12/1988 |
| JP | 3-11716 | | 1/1991 |
| JP | 5-29103 | | 2/1993 |
| JP | 05-029103 | | 2/1993 |
| JP | 05-12104 | | 5/1993 |
| JP | 5-121204 | | 5/1993 |
| JP | 6-5402 | * | 1/1994 |
| JP | 6-151103 | * | 5/1994 |
| JP | 10-83932 | | 3/1998 |
| JP | 11-12033 | * | 1/1999 |
| JP | 11-012033 | | 1/1999 |
| JP | 11-157925 | | 6/1999 |
| JP | 11-157925 A | | 6/1999 |
| KR | 9206732 | * | 8/1992 |

* cited by examiner

LAMINATED TYPE SEMICONDUCTOR CERAMIC ELEMENT AND PRODUCTION METHOD FOR THE LAMINATED TYPE SEMICONDUCTOR CERAMIC ELEMENT

This is a division of application Ser. No. 09/635,818, filed Aug. 9, 2000 now abandoned, which is hereby incorporated herein by reference.

BACKGROUND OF THE INVENTION

1. Field of the Invention

The present invention relates to a laminated type semiconductor ceramic element, in particular, to a laminated type semiconductor ceramic element having positive temperature-resistance characteristics, and to a production method therefor.

2. Description of the Related Art

It is known conventionally that barium titanate has superior positive temperature-resistance characteristics (hereinafter referred to as the PTC characteristics) with a small specific resistance at ordinary temperatures, and a drastic rise in resistance value at temperatures above the Curie point. Semiconductor ceramic elements containing the barium titanate as the main component are widely applied for demagnetization of cathode ray tubes, temperature control, overcurrent protection, heaters, and the like.

However, for the semiconductor ceramic elements to be used for these applications, a lower resistance at room temperature, a smaller size of the elements, and a higher pressure resistance have been seriously in demand. Japanese Unexamined Application Patent Publication No. 57-60802 discloses a laminated type semiconductor ceramic electronic part to meet the demand. The laminated type semiconductor ceramic part is produced by laminating semiconductor ceramic layers containing barium titanate as the main component, and internal electrode layers made from a Pt-Pd alloy alternately, and baking the same integrally. According to the laminated structure, the electrode area of the semiconductor ceramic electronic part can be drastically enlarged, and thus a small size of the electronic part itself can be achieved. However, there is a problem in that the room temperature resistance value rises in the case in which the internal electrodes are used because ohmic contact with the semiconductor ceramic cannot be realized.

Japanese Unexamined Patent Application Publication No. 6-151103 discloses a laminated type semiconductor ceramic electronic part using an Ni-based metal as the internal electrode material enabling the ohmic contact with the semiconductor ceramic. Since an internal electrode material using an Ni-based metal is oxidized in an ordinary atmosphere, it is necessary to conduct a re-oxidizing process at a temperature so as not to oxidize the Ni-based metal after the baking operation in a reducing atmosphere. Since the ohmic contact of the semiconductor ceramic and the internal electrode can be obtained, the room temperature resistance value rise can be prevented.

However, although the conventional laminated type semiconductor ceramic element has superior values in PTC characteristics and the room temperature resistance value, it is not used in practice due to a low withstand voltage.

SUMMARY OF THE INVENTION

Accordingly, an object of the present invention is to provide a laminated type semiconductor ceramic element with good PTC characteristics, a low room temperature resistance value and an improved withstand voltage of 15V or higher, and a production method therefor.

In order to achieve the object, a first aspect of the prevent invention is a laminated type semiconductor ceramic element comprising semiconductor ceramic layers made from a semiconductor ceramic containing barium titanate as the main component and internal electrode layers superimposed alternately, and an external electrode formed so as to be connected electrically with the internal electrode layers, wherein the semiconductor ceramic contains the element nickel at about 0.2 mol % or less (excluding 0 mol %).

While maintaining the room temperature resistance value at the conventional semiconductor ceramic element level, the PTC characteristics and the withstand voltage can be improved.

Moreover, in a second aspect of the laminated type semiconductor ceramic element according to the present invention, it is preferable that the semiconductor ceramic contain the element boron at about 0.2 to 20 mol %.

Since the element boron is contained in the semiconductor ceramic, the room temperature resistance value can be lowered.

Furthermore, a third aspect of the present invention is a production method for a laminated type semiconductor ceramic element comprising the steps of (1) obtaining a laminated product of semiconductor material layers containing a barium titanate as the main component and about 0.2 mol % or less (excluding 0 mol %) of the element nickel, and possibly boron, and internal electrode layers, (2) obtaining a laminated sintered compact by reduction baking of the laminated product, (3) forming an external electrode electrically connected with the internal electrodes of the laminated sintered compact, and (4) re-oxidization processing of the laminated sintered compact.

According to the production method, a semiconductor ceramic element having a low room temperature resistance value and superior PTC characteristics with an improved withstand voltage can be produced.

DESCRIPTION OF THE PREFERRED EMBODIMENTS

Figure 1:
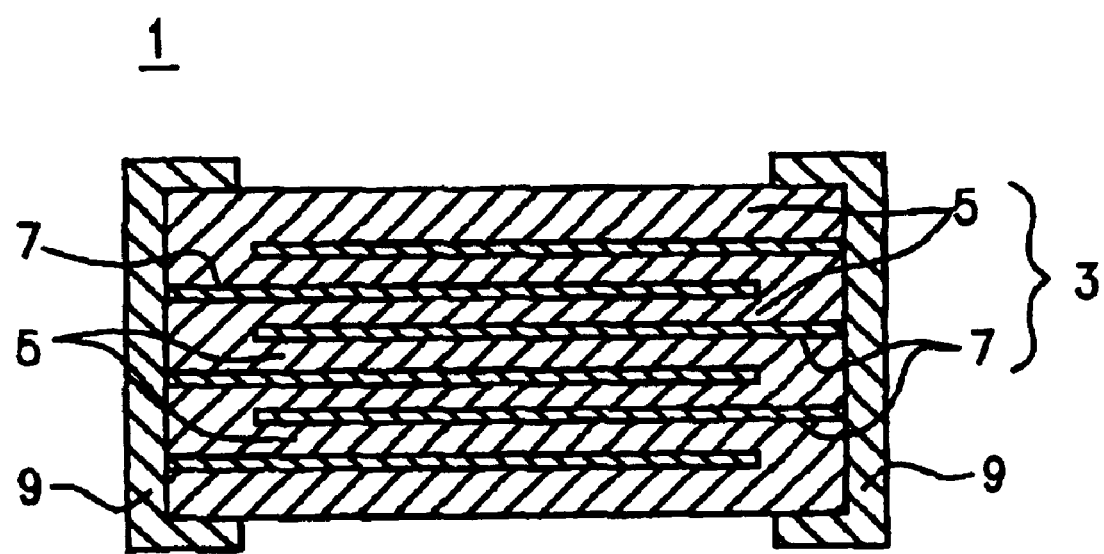
FIG. 1 is a schematic cross-sectional view of a laminated type semiconductor ceramic element according to the present invention.

A laminated type semiconductor ceramic element according to the present invention comprises layers of a semiconductor ceramic containing barium titanate as the main component and the element nickel and the element boron, and internal electrode layers laminated alternately, with an external electrode formed thereon.

The barium titanate contained in the semiconductor ceramic as the main component may contain other subcomponents. For example, some of the Ba may be substituted by Ca, Sr, Pb or the like as necessary, or some of the Ti may be substituted by Sn, Zr or the like. Moreover, examples of a semiconductor agent contained in the semiconductor ceramic include rare metal elements such as La, Y, Sm, Ce, Dy and Gd, and transitional elements such as Nb, Ta, Bi, Sb and W. Furthermore, an oxide of Si, Mn or the like, or a compound thereof may be added as needed.

Moreover, the ratio of Ba and Ti in the barium titanate is not particularly limited to 1:1, but may deviate slightly from the stoichiometric ratio.

The element nickel in the semiconductor ceramic is contained at about 0.2 mol % or less (excluding 0 mol %) in the form of nickel oxide. Moreover, the amount of nickel added is further preferably about 0.001 to 0.2 mol % so as to provide remarkable effects. The content of the element nickel here denotes the amount of the element nickel with respect to the titanate site of the barium titanate in the semiconductor ceramic.

The element boron in the semiconductor ceramic is contained at about 0.2 to 20 mol % in the form of boron oxide. The content of the element boron here denotes the amount of the element boron with respect to the titanate site of the barium titanate in the semiconductor ceramic. In the case in which the element boron is contained in the semiconductor ceramic, it is necessary to produce a liquid phase with a composition ratio $AB_3O_5$ (A: Ba site element, B: boron, O: oxygen), and to add the element at the Ba site additionally by $\frac{1}{3}$ mol with respect to the element boron to improve sintering properties.

The internal electrode layers are not particularly limited as to the composition thereof, but in view of the need for co-sintering with the semiconductor ceramic, and the need for the ohmic contact with the semiconductor ceramic, those made from nickel or those containing nickel as the main component are preferable.

The external electrode is not particularly limited as to the composition thereof. Specific examples thereof include silver, silver-palladium alloy, nickel and copper.

Moreover, a production method of a laminated type semiconductor ceramic element according to the present invention is for baking a laminated product comprising semiconductor material layers containing barium titanate as the main component and a nickel element (and possibly boron) added therein, and internal electrode layers in a reducing atmosphere, and forming an external electrode on the laminated sintered compact obtained by the re-oxidization process.

The laminated product is baked in the reducing atmosphere to prevent oxidization of the internal electrode layers. Examples of the reducing atmosphere include an $H_2/N_2$ atmosphere. The baking temperature and the baking time are not particularly limited, but are preferable 900 to 1,300° C. for 0.5 to 5 hours.

The re-oxidization process is to realize the PTC characteristics. Since it should be executed at a temperature so as not to oxidize the internal electrodes, the temperature is preferably about 500 to 900° C. The re-oxidization process can be executed simultaneously with the baking process of the external electrode, or the external electrode can be formed and baked after the re-oxidization process.

EXAMPLES

Hereinafter, a production method for a laminated type semiconductor ceramic element according to the present invention will be explained. FIG. 1 is a schematic cross-sectional view of a laminated type semiconductor ceramic element according to the present invention.

Example 1

As starting materials, $BaCO_3$, $CaCO_3$, $TiO_2$, $Sm_2O_3$, and NiO were prepared, measured and mixed so as to have the following composition.

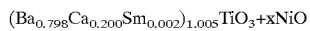

$(Ba_{0.798}Ca_{0.200}Sm_{0.002})_{1.005}TiO_3+xNiO$

By wet mixing of the obtained powders using a zirconia ball mill for 5 hours, a mixture was obtained. After calcinating the mixture at 1,100° C. for 2 hours so as to obtain a calcinated product, the calcinated product was mixed with an organic binder for forming a sheet so as to obtain a ceramic green sheet (semiconductor material layer). Then, an Ni paste was printed on the ceramic green sheet so as to obtain an internal electrode layer. These materials were laminated and pressed so as to provide a laminated product.

By reduction baking of the obtained laminated product in an $H_2/N_2$ atmosphere at 1,300° C. for 2 hours, a laminated sintered compact was obtained. Ag was baked on the surface of the laminated sintered compact having exposed internal electrodes at 800° C. as an external electrode, and the re-oxidization process was executed so as to obtain a laminated type semiconductor ceramic element 1 with an external electrode 9 formed on a laminated sintered compact 3 having semiconductor ceramic layers 5 and internal electrode layers 7 laminated alternately as shown in FIG. 1.

With the nickel content of the above-mentioned obtained semiconductor ceramic element altered, the room temperature resistance, the resistance change range and the withstand voltage thereof were measured. The room temperature resistance was measured by the four terminal method using a digital volt meter. The resistance change range was calculated by dividing the maximum resistance value by the minimum resistance value at room temperature to 250° C., and finding the common logarithm thereof. The withstand voltage is the maximum applied voltage value immediately before the element failed. These results are shown in Table 1. Specimen number 7 in the table indicates outside the range of the present invention.

TABLE 1

| Specimen number | Amount of the element Ni x | Resistance change range | Room temperature resistance value (Ω) | Withstand voltage (V) |
|---|---|---|---|---|
| 1 | 0.00001 | 3.0 | 0.51 | 14 |
| 2 | 0.00003 | 3.2 | 0.52 | 17 |
| 3 | 0.00010 | 3.3 | 0.53 | 20 |
| 4 | 0.00030 | 3.4 | 0.55 | 23 |
| 5 | 0.00100 | 3.4 | 0.58 | 26 |
| 6 | 0.00200 | 3.4 | 0.62 | 26 |
| 7* | 0.00300 | 3.1 | 1.20 | 35 |
| Comparative example | 0.00000 | 2.8 | 0.50 | 13 |

*Specimen number 7 is outside the range of the present invention.

As shown in Table 1, it was learned that the laminated type semiconductor ceramic elements according to the present invention have improved withstand voltage while maintaining excellent PTC characteristics and room temperature resistance value at the conventional laminated type semiconductor ceramic element level.

Example 2

As starting materials, $BaCO_3$, $TiO_2$, $Sm_2O_3$ NiO and BN were prepared, measured and mixed so as to have the following composition.

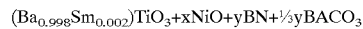

$(Ba_{0.998}Sm_{0.002})TiO_3+xNiO+yBN+\frac{1}{3}yBACO_3$

By wet mixing of the obtained powders using a zirconia ball mill for 5 hours, a mixture was obtained. After calcinating the mixture at 1,000° C. for 2 hours so as to obtain a calcinated product, the calcinated product was mixed with an organic binder to form a sheet so as to obtain a ceramic green sheet (semiconductor material layer). Then, an Ni paste was printed on the ceramic green sheet so as to obtain an internal electrode layer. These materials were laminated and pressed so as to provide a laminated product.

By reduction baking of the obtained laminated product in an $H_2/N_2$ atmosphere at 1,000° C. for 2 hours, a laminated sintered compact was obtained. Ag was baked on the surface of the laminated sintered compact with the exposed internal electrodes at 800° C. as external electrode, and a re-oxidization process was executed so as to obtain a laminated type semiconductor ceramic element 1 with an external electrode 9 formed on a laminated sintered compact 3 having semiconductor ceramic layers 5 and internal electrode layers 7 laminated alternately as shown in FIG. 1.

With the nickel content of the above-mentioned obtained semiconductor ceramic element changed, the room temperature resistance, the resistance change range, and the withstand voltage thereof were measured as in the example 1. These results are shown in Table 2. Specimen number 17 in the table indicates outside the range of the present invention, and indicates those specimen numbers 18 and 23 are outside the range of the second aspect.

Since a laminated type semiconductor ceramic according to the present invention is a laminated type semiconductor ceramic element comprising semiconductor ceramic layers made from a semiconductor ceramic containing barium titanate as the main component and internal electrode layers superimposed alternately, and an external electrode formed so as to be connected electrically with the internal electrode layers, wherein the semiconductor ceramic contains the element nickel at about 0.2 mol % or less (excluding 0 mol %), the PTC characteristics and the withstand voltage can be improved to 15V or more while maintaining the room temperature resistance value at the conventional semiconductor ceramic element level.

Moreover, since the element boron is contained at about 0.2 to 20 mol % in the semiconductor ceramic, the room temperature resistance value can be lowered.

Furthermore, since a production method for a laminated type semiconductor ceramic element according to the present invention comprises the steps of (1) obtaining a laminated product of semiconductor material layers containing a barium titanate as the main component and about 0.2

TABLE 2

| Specimen number | Amount of the element Ni x | Amount of the element B Y | Resistance change range | Room temperature resistance value ($\Omega$) | Withstand voltage (V) |
| --- | --- | --- | --- | --- | --- |
| 11 | 0.00001 | 0.06 | 3.3 | 0.17 | 13 |
| 12 | 0.00003 | 0.06 | 3.5 | 0.18 | 15 |
| 13 | 0.00010 | 0.06 | 3.6 | 0.18 | 16 |
| 14 | 0.00030 | 0.06 | 3.6 | 0.19 | 16 |
| 15 | 0.00100 | 0.06 | 3.4 | 0.20 | 17 |
| 16 | 0.00200 | 0.06 | 3.3 | 0.25 | 17 |
| *17 | 0.00300 | 0.06 | 3.0 | 0.53 | 18 |
| *18 | 0.00010 | 0.001 | 3.0 | 3.50 | 25 |
| 19 | 0.00010 | 0.002 | 3.2 | 0.41 | 15 |
| 20 | 0.00010 | 0.01 | 3.6 | 0.20 | 16 |
| 21 | 0.00010 | 0.10 | 3.6 | 0.18 | 16 |
| 22 | 0.00010 | 0.20 | 3.5 | 0.32 | 17 |
| *23 | 0.00010 | 0.25 | 2.9 | 1.50 | 18 |
| Comparative example | 0.00000 | 0.06 | 2.9 | 0.17 | 10 |

*Specimen number 17 is outside the range of the present invention, and Specimens 18 and 23 are outside the range of the second aspect.

As shown in Table 2, it was learned that the room temperature resistance value can be lowered in addition to improvement in the PTC characteristics and the withstand voltage by including the element boron in the semiconductor ceramic.

The reason for the limitation of the element nickel and the element boron in the semiconductor ceramic in the first to third aspects will be explained.

The element nickel content is limited to about 0.2 mol % or less in the first to third aspects because the room temperature resistance value is drastically increased in the case in which the element nickel content is more than about 0.2 mol %, as in the specimen numbers 7 and 17, and thus this is not preferable.

Moreover, the element boron content is limited to about 0.2 to 20 mol % in the second aspect because the sintering property cannot be improved as much as the resistance is increased in the case in which the element boron content is less than about 0.2 mol % as in the specimen No. 18, and thus this is not preferable. In contrast, the liquid phase amount is too large so that the resistance is high in the case in which the element boron content is more than about 20 mol % as in the specimen No. 23, and thus this is not preferable.

mol % or less (excluding 0 mol %) of the element nickel, and possibly boron, and internal electrode layers, (2) obtaining a laminated sintered compact by reduction baking of the laminated product, (3) forming an external electrode electrically connected with the internal electrodes of the laminated sintered compact, and (4) re-oxidization processing of the laminated sintered compact, a semiconductor ceramic element having a low room temperature resistance value and superior PTC characteristics with an improved withstand voltage can be produced.

What is claimed is:
1. A production method for a laminated type positive temperature-resistance semiconductor ceramic element comprising
   providing a mixture comprising a barium compound, a titanium compound and a nickel compound, wherein the nickel compound is present in the mixture in a positive amount up to about 0.2 mol %,
   calcining the mixture to obtain a calcined product;
   forming a ceramic green sheet comprising the calcined product;
   applying a conductive paste for forming an internal electrode layer of the laminated type semiconductor ceramic element on the ceramic green sheet;

laminating the ceramic green sheet so as to provide a laminated product; and baking the laminated product under a reducing atmosphere and reoxidizing the baked laminate so as to form a laminated positive temperature-resistance semiconductor ceramic element.

2. The production method of claim 1, wherein the mixture calcined contains a boron compound.

3. The production method of claim 1 in which an external electrode electrically conducted to the internal electrode is formed on the laminated semiconductor ceramic element.

4. The production method according to claim 3 wherein the laminated product is baked at a temperature of 900 to 1300° C. for 0.5 to 5 hours.

5. The production method according to claim 4 wherein the conductive paste contains nickel.

6. The production method according to claim 5 comprising forming the mixture of the barium compound, titanium compound and nickel compound.

7. The production method according to claim 1 wherein the laminated product is baked at a temperature of 900 to 1300° C. for 0.5 to 5 hours.

8. The production method according to claim 1 wherein the conductive paste contains nickel.

9. The production method according to claim 1 comprising forming the mixture of the barium compound, titanium compound and nickel compound.

10. A production method for a laminated type positive temperature-resistance semiconductor ceramic element comprising providing a mixture comprising a barium compound, a titanium compound, a boron compound and a nickel compound, wherein the boron compound is about 0.2 to 20 mol % and the nickel compound is present in the mixture in a positive amount up to about 0.2 mol %, calcining the mixture to obtain a calcined product;

forming a ceramic green sheet comprising the calcined product;

applying a conductive paste for forming an internal electrode layer of the laminated type semiconductor ceramic element on the ceramic green sheet;

laminating the ceramic green sheet so as to provide a laminated product; and baking the laminated product under a reducing atmosphere and reoxidizing the baked laminate so as to form a laminated positive temperature-resistance semiconductor ceramic element.

11. The production method of claim 10 in which an external electrode electrically conducted to the internal electrode is formed on the laminated semiconductor ceramic element.

12. The production method according to claim 11 wherein the laminated product is baked at a temperature of 900 to 1300° C. for 0.5 to 5 hours.

13. The production method according to claim 12 wherein the conductive paste contains nickel.

14. The production method according to claim 13 comprising forming the mixture of the barium compound, titanium compound and nickel compound.

* * * * *